United States Patent

[11] 3,604,713

[72] Inventors Dean C. Karnopp
Arlington;
John C. Heine, Cambridge, both of, Mass.
[21] Appl. No. 7,382
[22] Filed Feb. 2, 1970
[45] Patented Sept. 14, 1971
[73] Assignee Bolt Beranek and Newman Inc.
Cambridge, Mass.
Continuation of application Ser. No. 700,967, Jan. 26, 1968, now abandoned.

[54] MAGNETIC TAPE CARTRIDGE CHANGER SYSTEM
6 Claims, 4 Drawing Figs.

[52] U.S. Cl. .......... 274/4 F, 179/100.2 Z
[51] Int. Cl. .......... G11b 17/00
[50] Field of Search .......... 274/4 F, 11; 179/100.2 Z; 242/180, 181, 197–200; 352/6–8, 123; 353/15

[56] References Cited
UNITED STATES PATENTS

| | | | |
|---|---|---|---|
| 2,561,602 | 7/1951 | Valentino | 179/100.2 |
| 3,009,024 | 11/1961 | Eash | 179/100.2 |
| 3,127,178 | 3/1964 | Osborne | 274/11 |
| 3,247,328 | 4/1966 | Mitchell | 179/100.2 |
| 3,317,212 | 5/1967 | Tatter | 274/11 |
| 3,326,483 | 6/1967 | Ivans | 242/199 |
| 3,381,910 | 4/1968 | Fundingsland | 242/180 |

*Primary Examiner*—Leonard Forman
*Assistant Examiner*—Dennis A. Dearing
*Attorney*—Rines and Rines

ABSTRACT: Magnetic tape cartridge changer system wherein cartridges within a magazine may be selected at the discretion of the user or may be played in sequence automatically. Single reel cartridges are snapped into a circular magazine and have exposed portions which follow a circular path to reach a playing position at which a drive roller and transducing head are located. High frequency control signals on the tapes control a motor and gear drive for indexing the cartridges, and the magazine may be turned manually.

DEAN C. KARNOPP
JOHN C. HEINE, INVENTORS
BY Rines and Rines
ATTORNEYS

DEAN C. KARNOPP
JOHN C. HEINE, INVENTORS

BY Rines and Rines
ATTORNEYS

MAGNETIC TAPE CARTRIDGE CHANGER SYSTEM

This a continuation of application Ser. No. 700,967 filed Jan. 26, 1968 now abandoned. The present invention relates to magnetic tape recording and playing systems and, more particularly, to systems in which tape cartridges may be assembled into a changer magazine for permitting both random access to the individual cartridges and automatic sequential playback of the messages on the individual cartridges, if desired.

While the magnetic tape-recording of sound and other forms of information has obvious advantages over conventional disc records played with a needle, there remain serious drawbacks to present-day use of tape. Although tape cartridges are used in vehicles, such as automobiles and airplanes, there is, for example, no effective system for achieving access to a random portion of the recorded message, at will. The single-reel endless-loop cartridges cannot be driven in reverse nor can they be driven in a fast-forward mode. Two-reel systems may be driven in fast-forward and fast reverse modes, but the location of a particular place on the tape or a particular message involves a good deal of trial-and-error searching. On conventional cartridges, moreover, it is not easy to discard or replace individual messages. In a tape of popular songs, for example, an unwanted song in the middle of the tape presents a continuing source of annoyance. On the other hand, if cartridges with only a short length of tape and a small number of messages are used, either frequent changing of the cartridges is required or a device for automatically changing the cartridges is required. The latter possibility, however, has heretofore tended toward mechanically complex and bulky playing devices.

The present invention avoids the traditional disadvantages of tape cartridge systems by employing a magazine for cartridges which contain enough tape for messages of interest. For popular songs, as an illustration, the tape length may be sufficient for a play of about three minutes. In summary, the system of the invention embodies cartridges that are assembled at the user's discretion into the magazine which is subsequently handled as a unit, much in the manner of a single cartridge in prior art devices. Because the cartridge is specifically designed for the magazine, the amount of tape stored per unit volume in the loaded magazine may be comparable to that of prior cartridges. With the magazine, however, the user has random access to the messages stored in the cartridges and may easily replace any of the cartridges, at will. Since the loaded magazine forms a standard mechanically rugged unit, the provision for the equivalent of a cartridge-changing system which will play the cartridges sequentially and automatically is readily accomplished.

The primary object of the invention, accordingly, is to provide a new and improved tape cartridge changer system.

Other and further objects are hereinafter detailed and are more particularly pointed out in the appended claims.

The invention will now be described with reference to the accompanying drawing,

FIG. 1 of which is a plan view of a cartridge magazine system constructed in accordance with a preferred embodiment of the invention;

The particular design of the invention is suitable as a replacement for the conventional 45 r.p.m. record player; it being recognized, however, that the features of the invention are applicable to a wide variety of situations in which the physical size, width of tape, length of tape in a single cartridge, type of cartridge and detail shape of the magazine may vary considerably. This tape cartridge magazine concept, moreover, achieves a simple, compact, economical device which, in contrast to the 45 r.p.m. record changer, may be played in moving environments such as automobiles and without the need to keep the player level.

Figure 1:
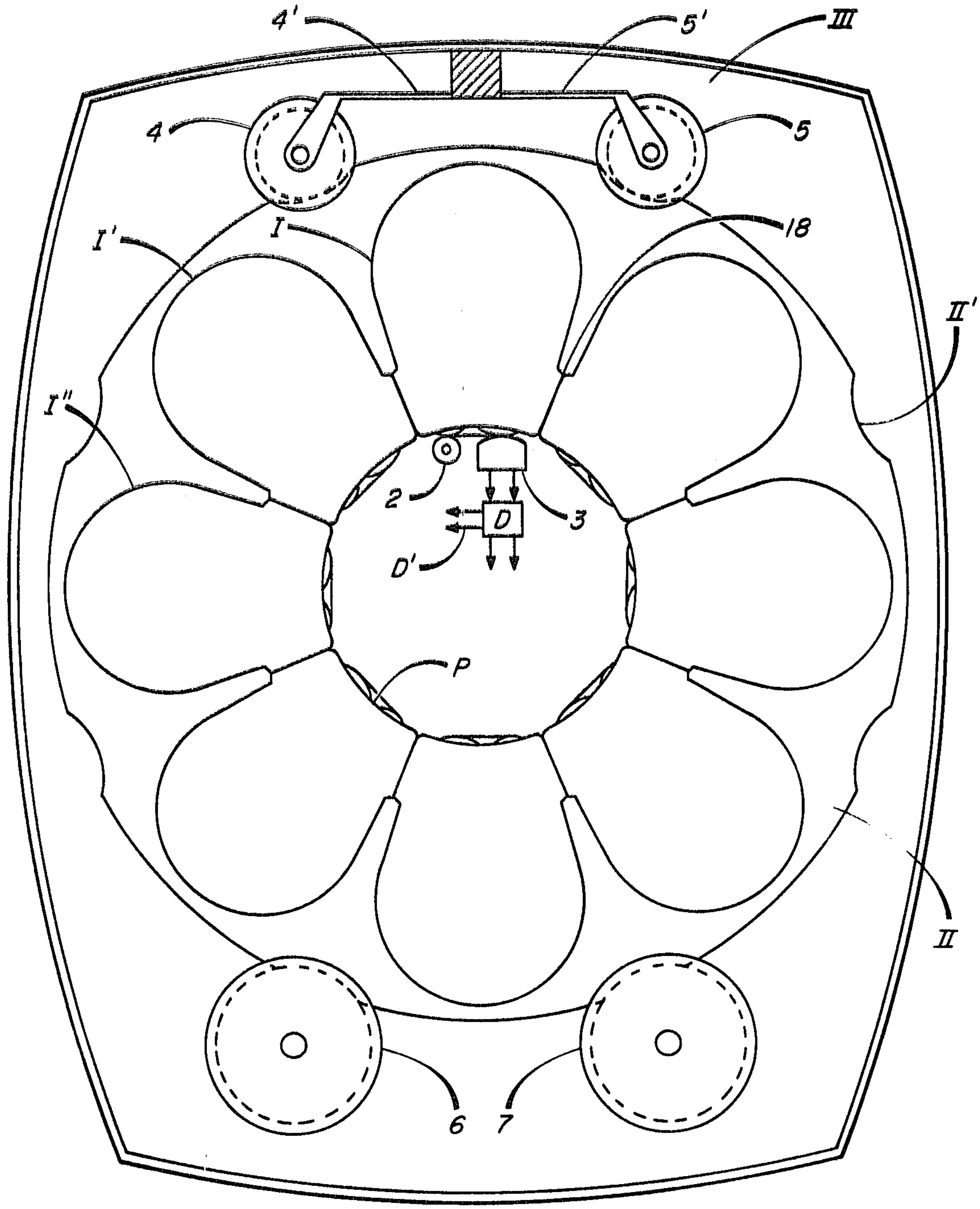
Figure 2:
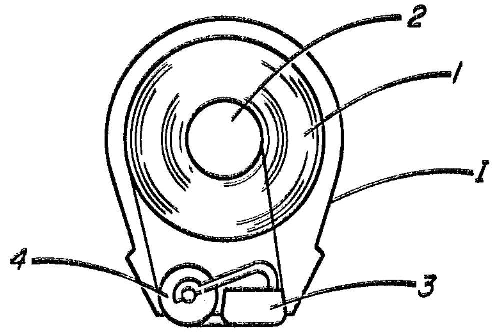
FIG. 2 is a top elevation of the cartridge of FIG. 1 with the top removed.

In FIGS. 1 and 2 are shown a cartridge and magazine construction which has, for illustration purposes, been designed into a shape and size comparable to a 45 r.p.m. record. The configuration of the magazine chosen, of course, influences the configuration of the cartridge which will fit the magazine best; and in FIGS. 1 and 2, the cartridge is constructed to fit, as at I, I′, I″, etc., into the pie-shaped segments or sectors of a substantially circular disc magazine II. The tape 1 is stored on a single reel, FIG. 2, with a tapered hub 2′, as in conventional practice. The tape 1 proceeds over a pressure pad 3′, which in operation holds the tape at the illustrated lower exposed portion of the cartridge against the transducing head, and then over a spring-loaded pinch roller 4. Because of the use of the magazine II, it is desirable to use cartridges which waste very little space, such that, in FIG. 2, the conventional design is modified in order to minimize the width required at the pinch roller and pressure pad. The size of the cartridge shown, almost to scale, is ample to hold tape sufficient for the contents of a typical 45 r.p.m. record on two-track tape running at 3¾ inches per second. Using ⅛-inch tape, the cartridge width is about one-fourth inch. Two separate tracks may be recorded on the tape for two songs, or for one stero version of a song, as illustrations.

In FIG. 1, the magazine II, is shown loaded with a full complement of a plurality of eight similar cartridges I, T′, I″, etc., inserted and removable from the top and detachably received in place in the magazine II by a frictional or detent system 18 acting along the sides of the cartridges. The magazine may have a platform III for added structural rigidity so long as the center part of each of the cartridges is open so that the read-and-record transducing head 3 and drive roller 2 may be brought into contact with the cartridge pressure pad and pinch roller at the exposed tape portion of the cartridge. The position of the read-and-record head 3 and the drive roller 2 during playing is shown in FIG. 1 relative to cartridge 1 and is typical for all other cartridges.

The head 3 and driver roller 2 are attached to the playing device and are illustrated to indicate relative positions during playback. For manual operation, the magazine II is simply rotated relative to the playback (or recording) transducer device 3 until the desired cartridge is in a position along the circular path P defined by the inner exposed-tape portions of the successive cartridges I, I′, I″, etc., suitable for playing (or recording). For automatic sequencing, the playing device must be capable of sensing a region such as end of a recorded message on each cartridge tape and in moving the magazine relative to the transducer device 3.

In FIG. 1, a high-frequency signal is employed on the tape at the end of the recording which is detected by the playback head 3 and used by detector D at output D′ to activate the sequence, the signal being outside the frequency range used in recording and playing back. Prior art also includes a variety of means that may be used for detecting the end of a recorded message such as, for example, a metal foil or other conducting material applied to the portion of the tape representing the end of the message and detected electrically with contacts, or holes in a special section of the tape. The mechanism for sequencing the magazine II in response to the output at D′ from the automatic detection at D that the cartridge being played has reached the end of the recorded message (or an output at D′ from a conventional reject button, not shown) will be now described with references to FIGS. 3 and 4.

The magazine II is located on the player between two flanged rollers 4 and 5, FIG. 1, which are flexibly mounted at 4′ and 5′ to the platform III, and two flanged rollers 6 and 7 rigidly mounted thereupon. The magazine is inserted into the player by pushing the rollers 4 and 5 back with the edge of the magazine II a sufficient distance to permit the magazine to pass over the flanges on rollers 6 and 7. These rollers may be of rubber or similar frictional material. Then the springs 4′ and 5′ on rollers 4 and 5 push the magazine into contact with rollers 6 and 7. Because of the plurality of spaced scalloped peripheral regions II′ of the magazine II, the magazine has preferred locking orientations such that one of the cartridges is always in playing position, as shown. When in such position on the player, the magazine II may be rotated by hand to any position. Because rollers 6 and 7 are fixed relative to the platform III, the magazine II moves away from the drive roller 2 and up against the spring restraints 4′ and 5′ for rollers 4 and 5 when the magazine is rotated away from one of the preferred playing positions. As the next playing position is approached, the magazine II again moves toward the drive roller 2 and playing head 3. The rollers 4 and 5 are always free to rotate, and except during automatic sequencing, the rollers 6 and 7 are also free to rotate.

Figure 3:
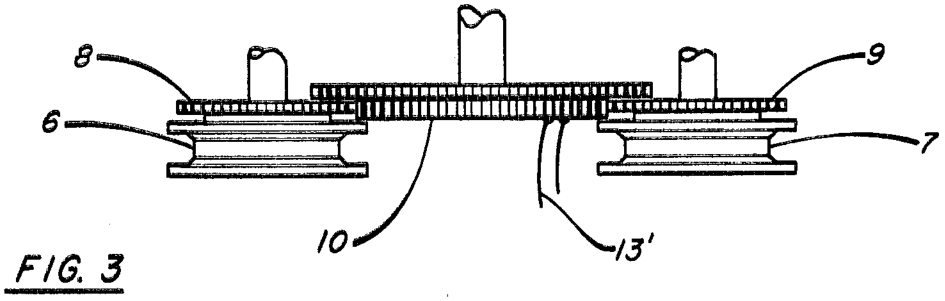
FIGS. 3 and 4 are side and top elevations, respectively, of the magazine changer drive system of FIG. 1.
Figure 4:
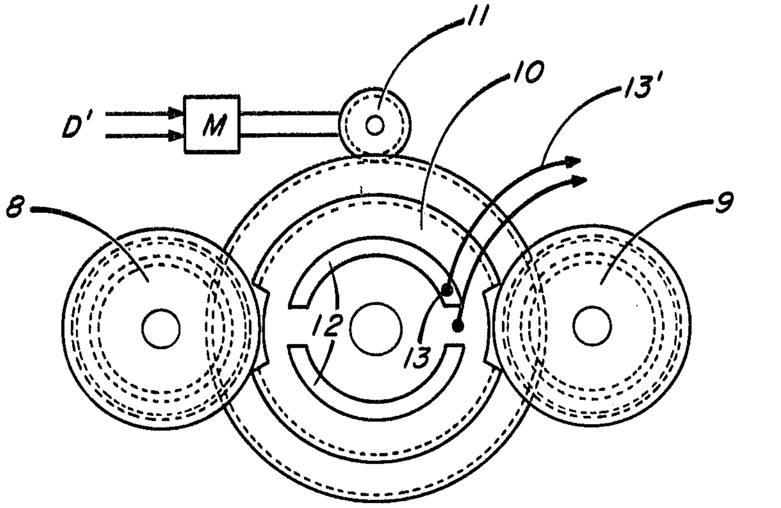

During sequencing, however, means are provided for driving one or more of the rollers 6 and 7. Gears 8 and 9, FIGS. 3 and 4, are directly connected to the rollers 6 and 7, respectively, and are on the same shafts. When a large double gear 10 is in the position shown, the gears 8 and 9, and hence, rollers 6 and 7 are free to rotate. When the sequence signal is received at D′, however, a drive pinion 11 begins to rotate being driven by the electric motor M. Shortly after rotation begins, the sequence signal may disappear; but the operation can continue through the medium of a contact strip 12 that has moved over in contact with a slider 13 also adapted at 13′ to energize the motor M. The contact strip 12 is arranged so that after initiating the sequence action, the gear 10 will make one-half a revolution and then halt when the contact strip 12 moves out from under the slider 13. The gear ratios between gears 8, 9 and 10 must be such that a half revolution at 10 results in a sequencing of the magazine II from one cartridge I, I′, etc. to the next. As the magazine II nears the next playing position the drive of gears 8 and 9 becomes disengaged due to an appropriate blank space in the gear teeth on gear 10; and the final positioning of the magazine (to present the exposed tape portion of the desired cartridge to the transducer 3) is achieved by the rollers as the magazine II moves down into playing position. Thus, after the sequencing is completed, the magazine II may be manually rotated without affecting the gears 10 and 11.

While there are many variations of changers which could achieve this automatic sequencing of the magazine, the one shown is particularly simple and rugged, especially when compared to the mechanism required to change a conventional disc record. Note that gravity plays no essential role in the device shown, and thus the device may be used without regard to orientation. Also, the device is much less sensitive to vibration than a conventional record player.

In operation, the operator or user selects which of the sets of tracks is to be played and then manually chooses the first cartridge I to be played. One cartridge may be played and the system then stopped; or, if desired, the system may go into an automatic sequencing mode of operation as above described.

It is recognized that many aspects of the particular design of the illustrated structure may be modified while remaining within the spirit of the invention. For example, the number of cartridges per magazine, the detailed shape of the cartridge, magazine and player and the mechanism for sequencing the magazine, or other relative moving mechanisms between magazine and transducer may be changed to suit the demands of the application and to achieve production economies. As before indicated, the invention is equally useful for recording, if desired.

Further modifications will also occur to those skilled in this art and all such are considered to fall within the scope and spirit of the invention.

What is claimed is:

1. A magnetic tape changer system having, in combination, a substantially disc-shaped magazine provided with means for detachably receiving a plurality of similar tape cartridges in successive positions about the circumference of the magazine with the tapes of successive received cartridges exposed at predetermined portions thereof and defining a substantially circular path, means disposed along said path at a transducing position for transducing signals at said exposed tape portions, a platform for rotatably supporting said magazine, means for rotating said magazine with respect to said platform and said transducing means about the axis of said magazine to select a predetermined cartridge for the transducing of a tape at said transducing position, said platform having roller means at opposite sides thereof engaging said magazine, the roller means at one side of said platform having a fixed rotational axis and the roller means at the opposite side of said platform having a movable rotational axis spring biased toward said magazine, the periphery of said magazine having a plurality of depressions into which said roller means enter when a cartridge is located at said tape-transducing position, whereby the magazine moves away from the fixed-axis roller means as it is rotated to bring a cartridge into said tape-transducing position, said transducing means being positioned relative to said magazine so that the magazine moves away from said transducing means as it is rotated, and means for constraining relative movement of said magazine and said transducing means substantially to a plane parallel to said magazine.

2. A system as claimed in claim 1, said means for rotating said magazine comprising motor drive and gear means responsive to a predetermined signal for driving said fixed-axis roller means, said gear means being disengaged when a cartridge is located at said transducing position.

3. A system as claimed in claim 1, wherein a single tape drive means for all said cartridges is located adjacent to said transducing means and engages an exposed portion of the tape of each cartridge as the cartridge moves into said transducing position.

4. A system as claimed in claim 3, wherein said magazine has a central opening and said transducer means and drive means are located in said opening.

5. A system as claimed in claim 4, wherein said system includes a plurality of substantially flat tape cartridges supported upon said magazine substantially parallel thereto, each of said cartridges tapering toward a narrow end positioned within the central opening of said magazine, each of said cartridges having a pair of means juxtaposed with the exposed portion of its tape and adapted to support the tape for cooperation with said transducer means and said tape drive means, respectively, at said transducing position.

6. A system as claimed in claim 1, further comprising means responsive to the reaching of a predetermined region of a tape at the transducing position for automatically sequencing the rotation of the magazine to cause a different cartridge carried by the magazine to be brought to the transducing position.